No. 892,468.

PATENTED JULY 7, 1908.

J. UNGER.
GRAVITY PLUMB AND LEVEL.
APPLICATION FILED JULY 15, 1905.

Witnesses,
Charlie R. Chesmore
Homer L. Boyd

Inventor:
John Unger

UNITED STATES PATENT OFFICE.

JOHN UNGER, OF LOUISVILLE, COLORADO.

GRAVITY PLUMB AND LEVEL.

No. 892,468.

Specification of Letters Patent.

Patented July 7, 1908.

Application filed July 15, 1905. Serial No. 269,896.

*To all whom it may concern:*

Be it known that I, JOHN UNGER, a citizen of the United States, residing at Louisville, in the county of Boulder and State of Colorado, have invented a new Gravity Plumb and Level, of which the following is a specification.

This invention relates to a gravity plumb and level in which a weighted index hand traveling about a circular dial plate will indicate the inclination of a timber, shaft or other object to which the level may be applied.

The object of the invention is a device of the kind described in which the index hand may be quickly read from either side of the level and a further object is to provide a device of the kind in which a single index hand travels about a two-faced dial, the dial faces being visible from opposite directions.

Figure 2:
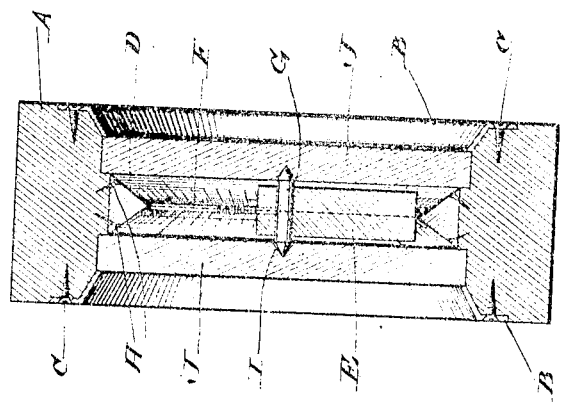
Figure 1:
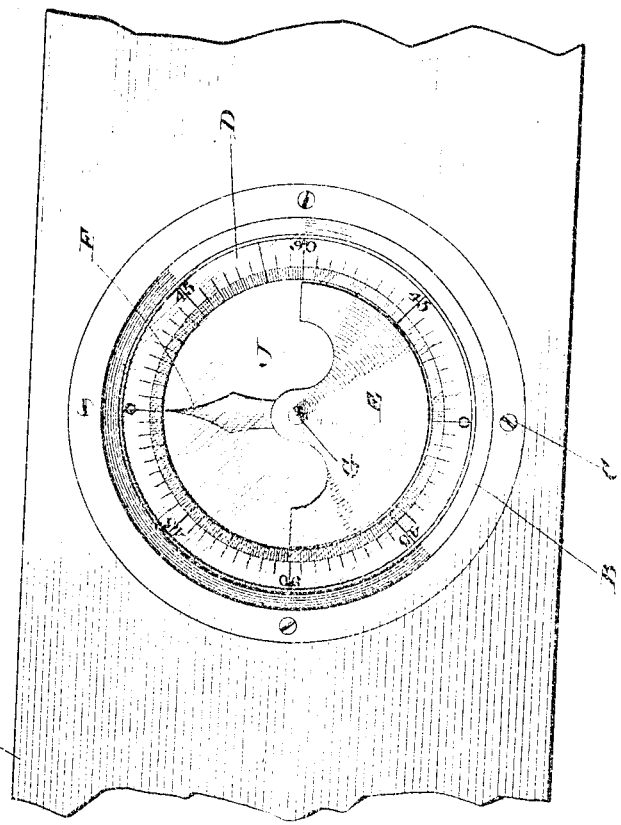

In the accompanying drawings,—Figure 1 is a side elevation, the level being partly broken away. Fig. 2 is a transverse section taken substantially across the center of the dial.

In these drawings A represents a level which is provided with a centrally circular opening the edges of which are beveled and upon each side of the level a circular flanged plate B is set in the level surrounding said opening, the flanges of the plate resting upon the bevels of the marginal portions of the said opening. These plates not only protect the edges of the opening but also serve to hold the various parts to be hereinafter described in place, and in order that the parts may be readily removed when desired the plates B are held in position by means of screws C. Within the opening is fixed a rim dial, said dial being V-shape in cross section, one piece of the dial fitting snugly against the walls of the opening and being secured in place by screws H. The wall of the opening is also rabbeted upon opposite sides of the dial D thus forming two annular shoulders upon opposite sides of said dial ring and glass disks J are fitted in the opening, each disk being held between one of said shoulders and one of the plates B. The inner face of each disk J is centrally recessed to form bearings I for the ends of a needle shaft G. Upon this shaft is hung a semi-circular weight E which carries an index finger F, the said finger rotating about the shaft G in alinement with the projecting edge or apex of the V-shaped dial ring D. The ring upon its two visible opposing faces is graduated in any desired manner and it will be obvious that by adjusting the parts when assembled so that when the level A is in an absolutely horizontal plane that the index finger F will point to zero and if the dial ring is properly graduated any inclination out of the horizontal of the level A will be accompanied by a proportional swinging movement upon the part of the index finger F which will show by its travel along the edge of the dial ring the extra number of disks out of the horizontal of the level A.

Having thus fully described my invention, what I claim as new and desire to secure by Letters Patent is:—

A device of the kind described comprising a level having a circular opening, the walls of which are rabbeted to form annular shoulders, the marginal portions of said opening being beveled, circular flanged plates surrounding said opening, the flanges of the plates bearing upon the beveled portions, glass disks held in said opening between the flanges and shoulders respectively, a dial ring V-shaped in cross section said ring being secured in the opening between the glass disks, bearings being formed in the inner faces of said glass disks, a shaft mounted in said bearings, a weight suspended from said shaft, and an index finger carried by said weight and traveling along the projecting edge of the dial ring, the visible faces of said ring being suitably graduated.

JOHN UNGER.

Witnesses:
CHARLIE R. CHESMORE,
NESTOR FOSS.